United States Patent
Huang et al.

(10) Patent No.: US 11,413,968 B2
(45) Date of Patent: Aug. 16, 2022

(54) METHOD AND APPARATUS FOR PROVIDING IMPROVED MOTION CONTROL OF MOVERS IN AN INDEPENDENT CART SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US); Tracy M. Clark, Devens, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 376 days.

(21) Appl. No.: 16/575,630

(22) Filed: Sep. 19, 2019

(65) Prior Publication Data

US 2021/0088081 A1   Mar. 25, 2021

(51) Int. Cl.

| | |
|---|---|
| *B60L 13/03* | (2006.01) |
| *B60L 15/00* | (2006.01) |
| *H02K 41/025* | (2006.01) |
| *H02K 41/03* | (2006.01) |
| *B65G 54/02* | (2006.01) |
| *B65G 35/06* | (2006.01) |
| *F16C 41/00* | (2006.01) |
| *F16C 29/02* | (2006.01) |

(52) U.S. Cl.
CPC .............. *B60L 15/005* (2013.01); *B60L 13/03* (2013.01); *B65G 35/06* (2013.01); *B65G 54/02* (2013.01); *H02K 41/025* (2013.01); *H02K 41/031* (2013.01); *B60L 2200/26* (2013.01); *F16C 29/02* (2013.01); *F16C 41/007* (2013.01); *F16C 2233/00* (2013.01)

(58) Field of Classification Search
CPC ........ B60L 13/03; B60L 15/005; B60L 15/38; B65G 54/02; B65G 35/06; B65G 2203/0283; B65G 43/00; H02K 41/025; H02K 41/031; F16C 29/02; F16C 41/007; F16C 2233/00
See application file for complete search history.

(56) References Cited

U.S. PATENT DOCUMENTS

| | | | | |
|---|---|---|---|---|
| 5,116,002 A | * | 5/1992 | Veraart | B60L 15/005 246/187 R |
| 5,118,055 A | * | 6/1992 | Veraart | B60L 15/005 246/31 |

(Continued)

*Primary Examiner* — Zachary L Kuhfuss
(74) *Attorney, Agent, or Firm* — Boyle Fredrickson, SC

(57) ABSTRACT

A motion control system for an independent cart system provides for a minimum spacing between movers that is less than the width of a coil used to control motion of the movers. Blocks are statically or dynamically defined along the length of each track segment, where the width of a block is less than the width of a coil along the same track segment. Dividing the width of each coil into smaller block widths provides for an improved resolution of control for each mover. The blocks may also establish collision prevention between movers without requiring knowledge of the position of adjacent movers. Each block is assigned to a single mover at a time, but multiple blocks may be assigned to a single mover. A mover is permitted to only move within those blocks assigned to it and cannot have blocks assigned to it that are already assigned to another mover.

20 Claims, 10 Drawing Sheets

(56) References Cited

U.S. PATENT DOCUMENTS

| | | | |
|---|---|---|---|
| 5,127,599 A * | 7/1992 | Veraart | B60L 15/005 |
| | | | 246/182 R |
| 2018/0327009 A1* | 11/2018 | Takagawa | B61L 23/041 |
| 2019/0084781 A1* | 3/2019 | Huang | B65G 43/00 |

* cited by examiner

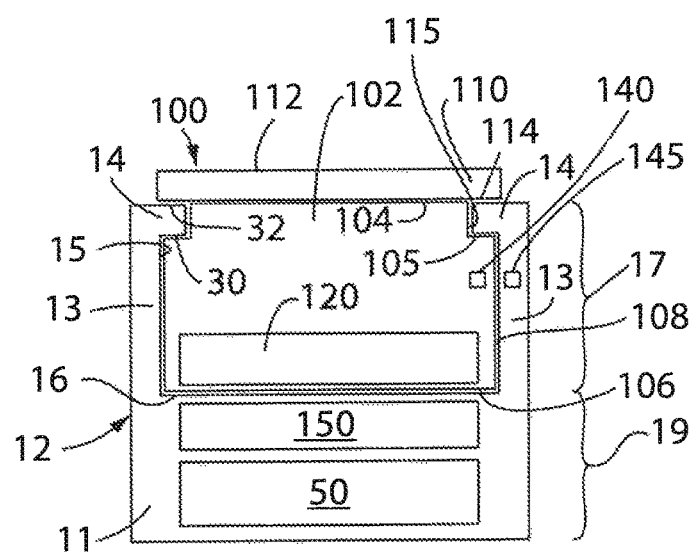
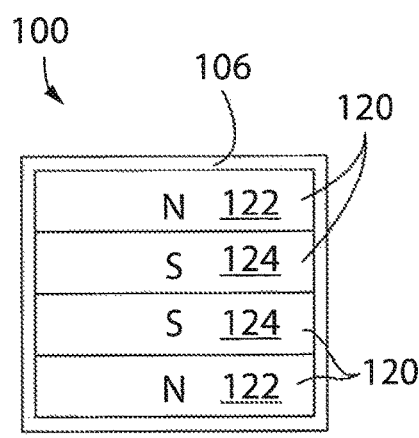
FIG. 2
FIG. 3
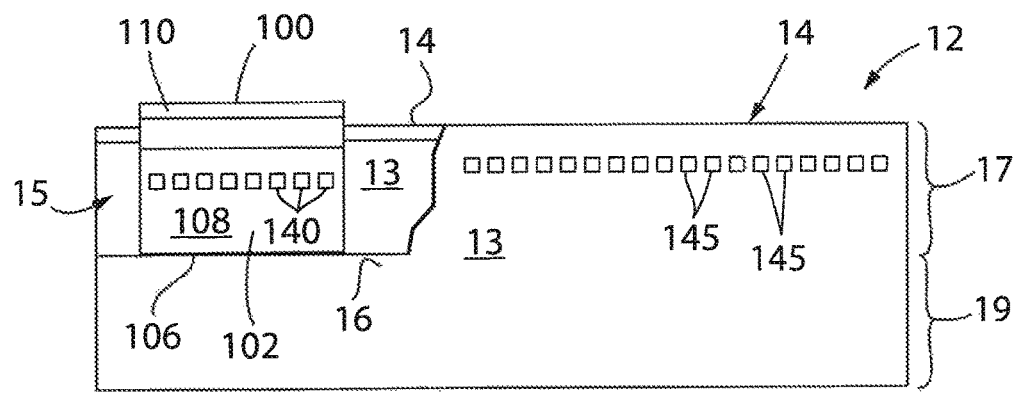
FIG. 4

METHOD AND APPARATUS FOR PROVIDING IMPROVED MOTION CONTROL OF MOVERS IN AN INDEPENDENT CART SYSTEM

BACKGROUND INFORMATION

The present invention relates to motion control systems and, more specifically, to providing improved quality of motion for the movers and collision prevention between movers in an independent cart system.

Motion control systems utilizing movers and linear drives in an independent cart system can be used in a wide variety of processes (e.g, packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

One important task in a linear drive system is to prevent collisions between movers. If a first mover stops on the track, each mover following along the same track must similarly stop to avoid colliding with the first mover. If movers could be brought to stop in tandem in a controlled manner, there would be no need for space between movers, and each mover could operate directly adjacent to the next mover. However, attempting to operate movers in tandem with no space between adjacent movers fails to account for fault conditions. Under a fault condition, the first mover may encounter an obstacle, experience a failure, or experience some other operating condition that may bring the first mover to an unexpected and/or abrupt stop. Under such a fault condition, the first mover may experience damage, but it would be desirable to avoid damage to any additional movers as a result of collisions between movers following the first mover.

Historically, it has been known to define a minimum braking distance for each mover. The minimum braking distance for each mover is defined by the speed at which a mover is operating and by the maximum deceleration rate allowed for the mover. Based on the speed of operation and the maximum rate at which the mover is allowed to decelerate, the controller can determine the minimum braking distance required for a mover to come to a stop, if each mover is kept separated from another mover by the minimum braking distance during operation, each mover following the first mover can be brought to a stop before colliding with the first mover in the event the first mover comes to an abrupt and/or unexpected stop.

In order to maintain a minimum spacing between movers, a controller requires knowledge of the position for a first mover along the track as well as the position of the mover adjacent to and in the direction of travel of the first mover. The controller uses the position of the first mover, for which it is determining a minimum spacing, as well as the position of the adjacent mover in the direction of travel of the first mover to verify that the minimum spacing is maintained. If the first mover begins to approach the adjacent mover such that the distance between the two movers is less than the minimum spacing, the controller must take action to reduce the speed and/or stop motion of the first mover such that it does not collide with the adjacent mover. Providing collision prevention by maintaining a minimum spacing between movers, therefore, requires calculations for each mover that depend on the real-time knowledge of the positions for two movers.

Thus, it would be desirable to provide an improved system for preventing collisions for one mover without requiring knowledge of an exact position of the mover adjacent to the first mover.

In a linear drive system, energization of one coil creates an electromagnetic field that interacts with each mover proximate the energized coil. In order to provide reliable control of each mover, the controller determines a current for each coil, which, in turn, generates the electromagnetic field, as a function of a single mover at a time. Thus, a mover approaching a coil being used to control an adjacent mover is prevented from entering the region along the track of the next coil until the previous mover has cleared the coil. As a result, the minimum spacing between movers is limited to the width of each coil. However, the width of each coil may exceed the minimum braking distance of a mover and may, therefore, create greater spacing between movers than necessary according to the control capabilities of the system.

Another important task in a linear drive system is to provide smooth motion and efficient throughput of movers along the linear drive system. In order to improve throughput, it is desirable to minimize the spacing between adjacent movers. An excessive spacing requirement between adjacent movers may result in what is referred to as a "caterpillar effect." A first mover approaches an adjacent coil but reaches the minimum spacing established as a result of the coil width rather than the minimum braking distance and must slow down or stop until the prior mover clears the coil. Once the adjacent mover clears the next coil, the first mover then travels along the next coil, again stopping at the end of the coil until the prior mover clears the next coil. While a series of movers may travel along several coils in succession without slowing down if they are travelling at the same speed and are able to maintain a consistent spacing at least as great as the width of a coil, when a speed change occurs along the track, movers approaching a slow down region will exhibit the caterpillar effect as a mover in front travels along the next coil at a speed slower than the speed at which preceding movers are permitted to travel along the earlier coils. The caterpillar effect is reduced, allowing for smoother travel, and throughput is increased if the minimum spacing between movers is reduced.

Thus, it would be desirable to provide a motion control system for an independent cart system that improves the quality of motion of movers along the track.

According to one object of the invention, the improved motion control provides for a minimum spacing between movers that is less than the width of a coil used to control motion of the movers.

According to another object of the invention, the improved motion control reduces the caterpillar effect between movers and increases the throughput of movers in the independent cart system.

BRIEF DESCRIPTION

The subject matter disclosed herein describes a motion control system for an independent cart system that improves the quality of motion of movers along the track. The improved motion control provides for a minimum spacing between movers that is less than the width of a coil used to control motion of the movers. Blocks are defined along the length of each track segment, where the width of at least one block is less than the width of a coil along the same track segment. In one embodiment, the width of each block defined along the track segment is less than width of each coil along the track segment. It is contemplated that the width of the blocks may be static or dynamic. If the width of each block is static, it is contemplated that tens or hundreds of blocks may be defined within the width of each coil. Dividing the width of each coil into smaller block widths provides for an improved resolution of control for each mover. If the width of each block is dynamic, it is contemplated that the width of each coil may be divided into three or five blocks, where the width of the block varies as movers travel along the track segment. Dynamic variation of the width of each block similarly provides improved resolution of control for each mover. The improved motion control reduces the caterpillar effect between movers, reduces the minimum spacing required between movers, and increases the throughput of movers in the independent cart system.

The blocks defined above to improve motion control may also be used to establish collision prevention between movers that does not require precise knowledge of the position of adjacent movers. Each block may be either assigned to one of the movers or unassigned to any of the movers. However, the block is only assigned to a single mover at a time. Multiple blocks may be assigned to a single mover and, in practice, as a mover travels along the track, a series of adjacent blocks are assigned to the mover, and the mover is permitted to travel only within the blocks assigned to the mover. As the mover travels along the track, new blocks in the direction of travel are assigned to the mover as it approaches the blocks and previously assigned blocks across which the mover has already travel are unassigned, or released, from the mover. If another mover is located along the track in the direction of travel of a mover, it will already have had blocks assigned. The mover traveling along the track, cannot have a new block assigned to it in the direction of travel if an adjacent mover already possesses the block. In this manner, a mover is permitted to only move within those blocks assigned to it and cannot have blocks assigned to it that are already assigned to another mover. Thus, the mover will be prevented from colliding with another mover based on the blocks that are assigned to each of the movers without requiring knowledge of the actual position of the adjacent mover.

According to one embodiment of the invention, a system for improved motion control in a linear drive system includes a track, multiple movers operative to travel along the track, and a controller. The track includes multiple track segments, where each of the track segments includes multiple drive coils positioned along the corresponding track segment. Each of the drive coils has a first width, and each of the track segments is divided into multiple blocks. At least one of the blocks has a second width, where the second width is less than the first width. Each mover includes at least one drive member operative to propel the corresponding mover along the track responsive to electromagnetic fields generated by each of the plurality of drive coils. The controller is operative to assign each of the blocks to only one of the movers at a time and to allow each of the movers to travel along the track only within each of the blocks assigned to the corresponding mover.

According to another embodiment of the invention, a system for improved motion control in a linear drive system, includes multiple track segments, defining a track, multiple movers operative to travel along the track, and a controller. Each of the track segments includes multiple first drive members positioned along the corresponding track segment, where each of the first drive members has a first width. Each of the track segments is divided into multiple blocks. At least one of the blocks has a second width, where the second width is less than the first width. Each mover includes at least one second drive member. The at least one second drive member is operative to engage the first drive members along each of the plurality of track segments to propel the corresponding mover along the track. Either the first or second drive member generates an electromagnetic field, and the mover travels along the track segment responsive to the electromagnetic field. The controller is operative to assign each of the blocks to only one of the plurality of movers at a time, and to allow each of the movers to travel along the track only within each of the blocks assigned to the corresponding mover.

According to still another embodiment of the invention, a method for improved motion control in a linear drive system is disclosed. Multiple blocks are defined along a length of each track segment, where each track segment is selected from multiple track segments. The track segments define a track along which movers are operative to travel. Each of the track segments includes multiple drive coils positioned along the length of the corresponding track segment. Each of the drive coils has a first width, and at least one of the blocks has a second width, where the second width is less than the first width. Each of the blocks is assigned to only one of the plurality of movers at a time with a controller for the linear drive system, and operation of each mover is controlled along the track segment with the controller, such that each mover is positioned only within each of the blocks assigned to the corresponding mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
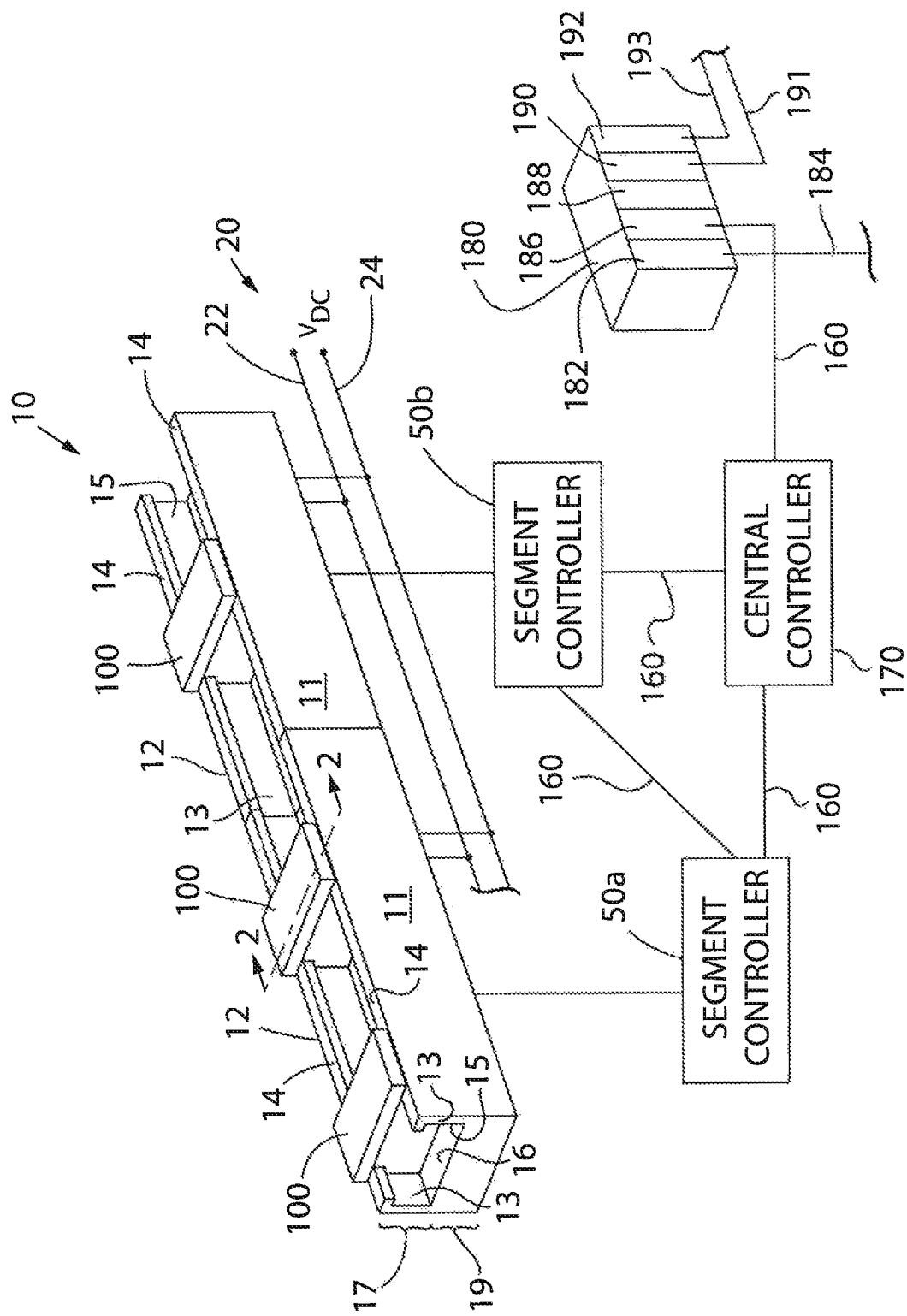
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 4) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount.

According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106 configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel back iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
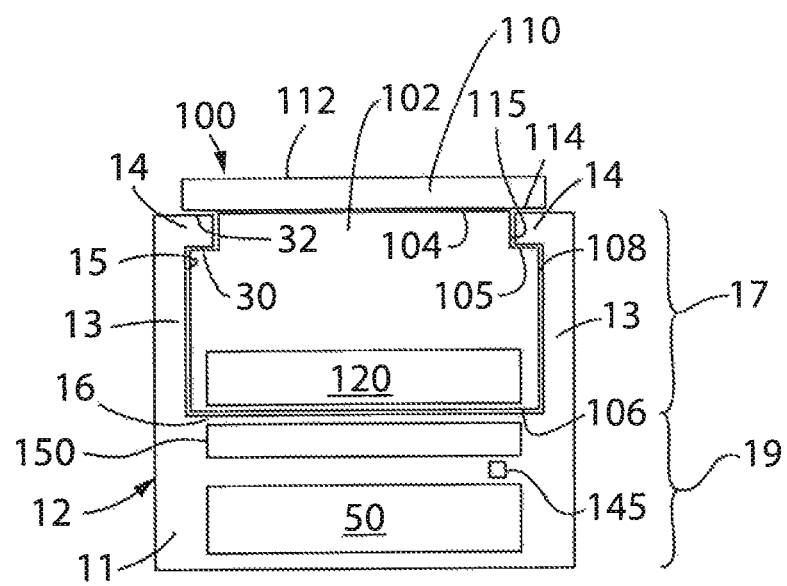
FIG. 5 is a sectional view of another embodiment of a mover and track segment included in the linear drive system taken at 2-2 of FIG. 1.
Figure 7:
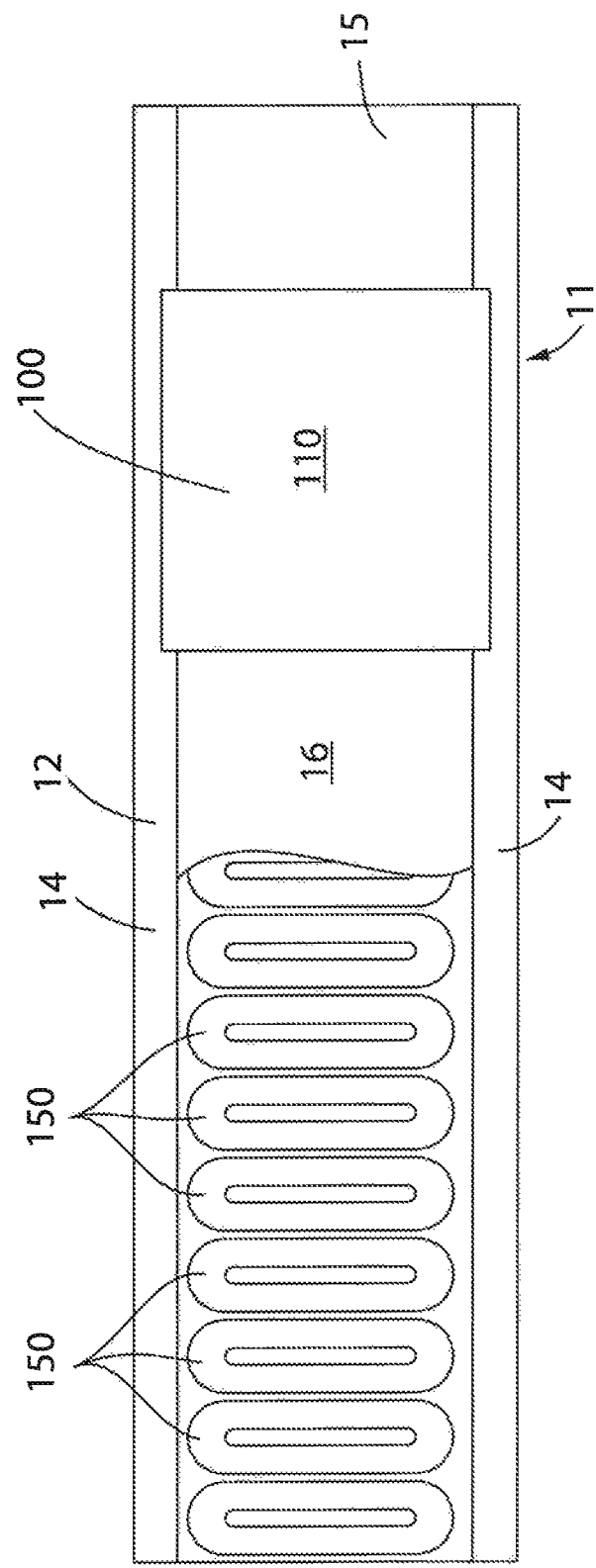
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, h is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to till and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
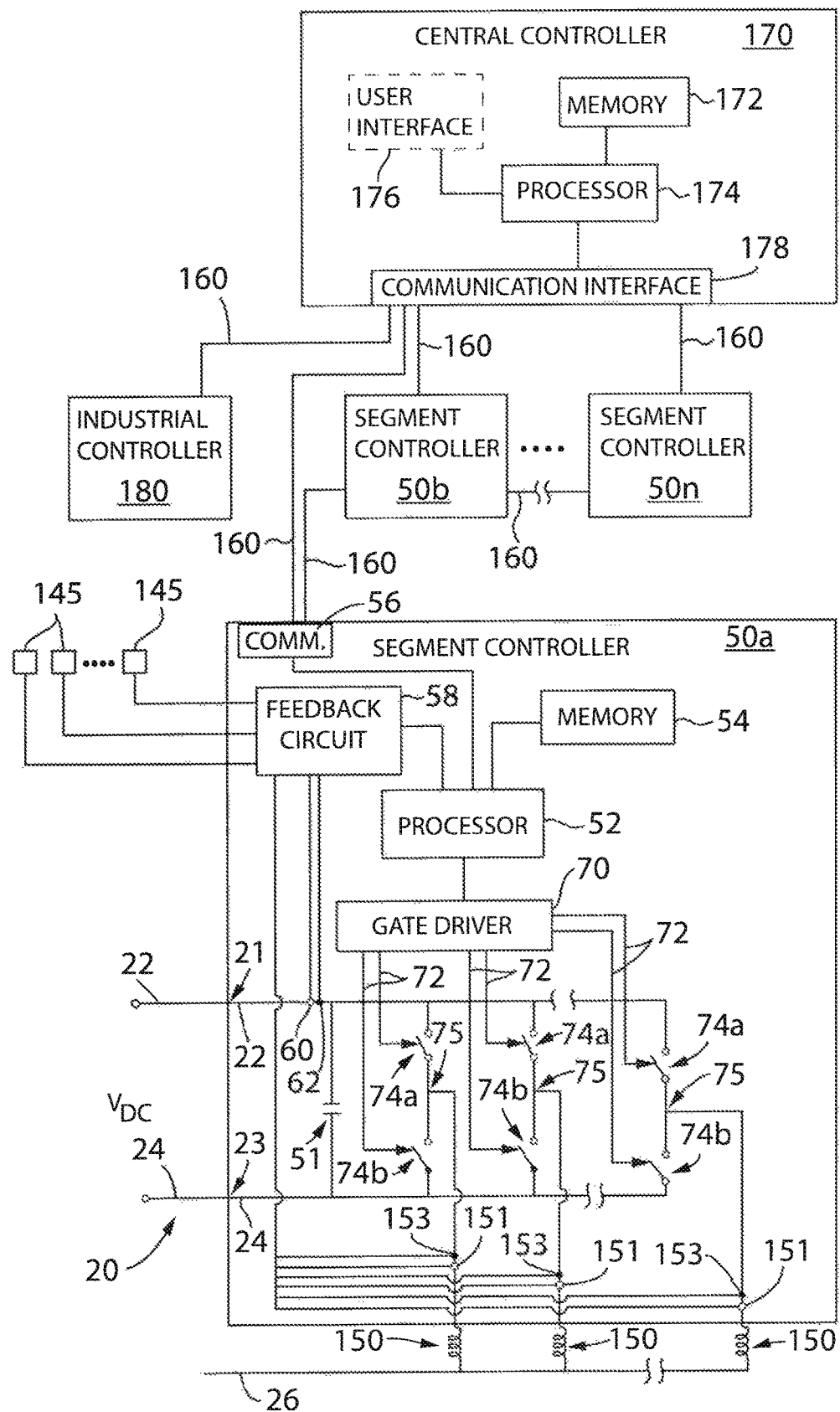
FIG. 8 is a block diagram representation of one embodiment of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
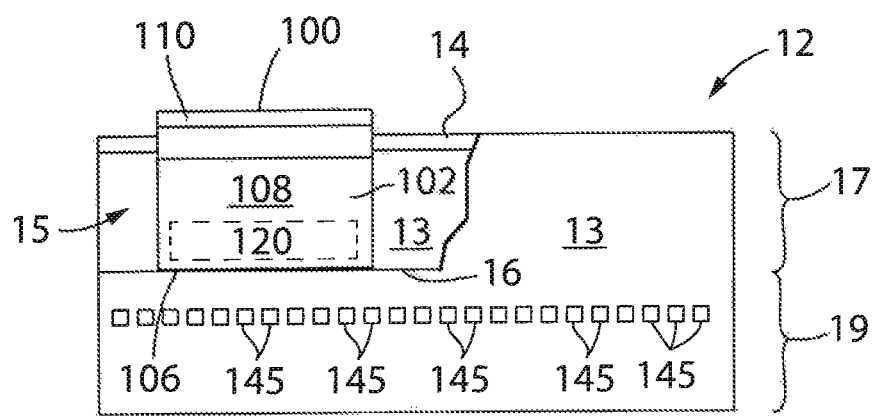
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC, voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC, voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the embodiment illustrated in FIG. 8, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

Figure 9:
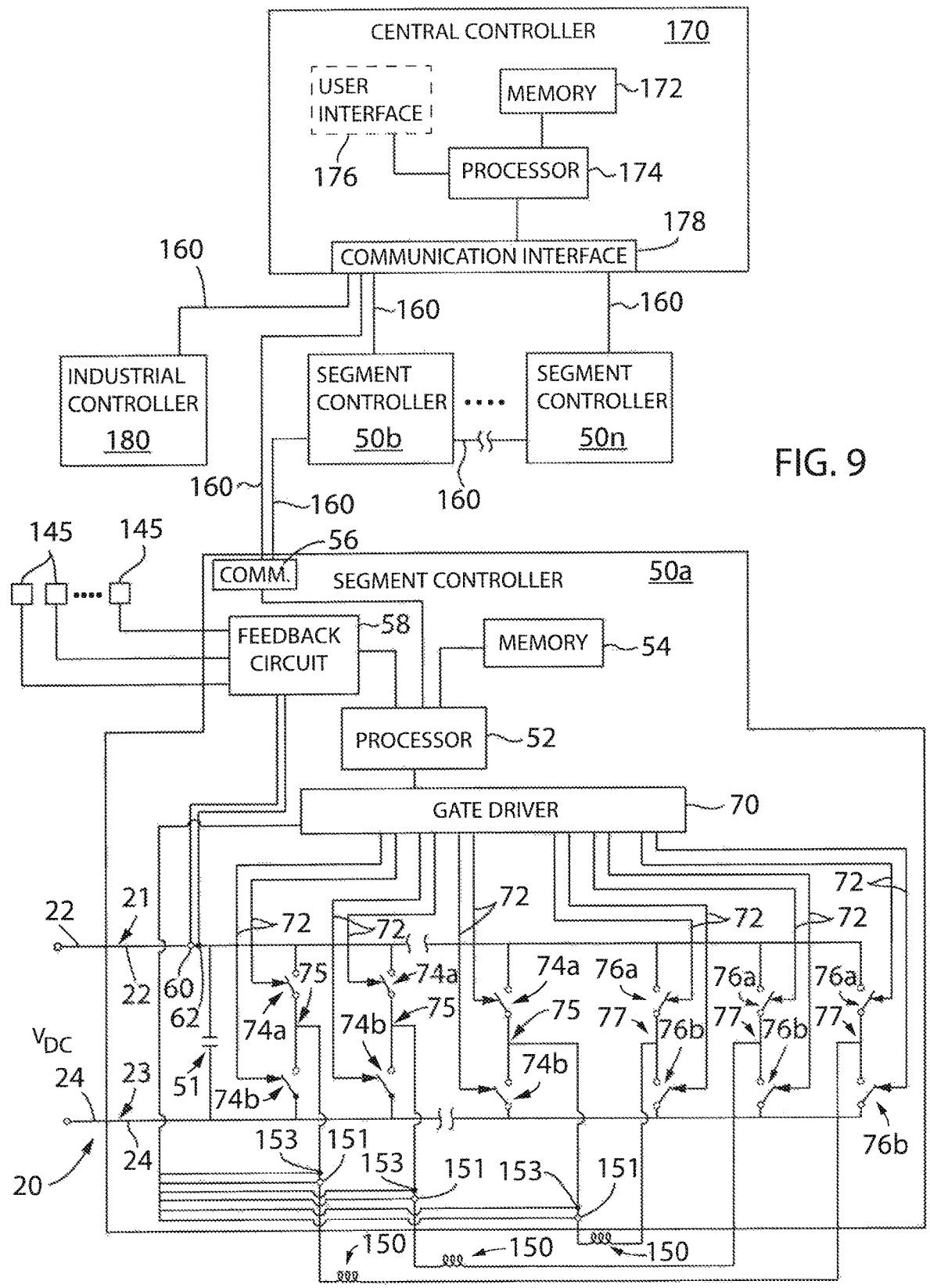
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 150 extending along the track segment 12. Each leg includes a first switching device 74a and a second switching device 74b connected in series on one side of the coil 150. The first and second switching devices 74a, 74b are connected between the positive rail 22 and the negative rail 24 with a first common connection 75 between the first and second switching devices 74a, 74b. The first common connection 75 is connected to the first side of the coil 150, Each leg further includes a third switching device 76a and a fourth switching device 76b connected in series on the other side of the coil 150. The third and fourth switching devices 74a, 74b are connected between the positive rail 22 and the negative rail 24 with a second common connection 77 between the first and second switching devices 74a, 74b. The second common connection 77 is connected to the second side of the coil 150. The first and third switching devices 74a, 76a in each leg may also be referred to herein as upper switches, and the second and fourth switching devices 74b, 76b in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off, Each of switching devices 74, 76 may further include a diode connected in a reverse parallel manner between the first or second common connection 75, 77 and either the positive or negative rail 22, 24.

With reference again to FIG. 8, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. With reference also to FIG. 9, it is contemplated that the feedback signals from the current sensor 151 and/or the voltage sensor 153 corresponding to the operation of the coils 150 may be provided to a dedicated current regulator device. As shown in FIG. 9, the feedback signals are provided directly to the gate driver 70 which would, in turn, regulate the current output to each coil and generate the switching signals 72 accordingly. The energized coils 150 create an electromagnetic field that interacts with the drive magnets 120 on each mover 100 to control motion of the movers 100 along the track segment 12.

Figure 10:
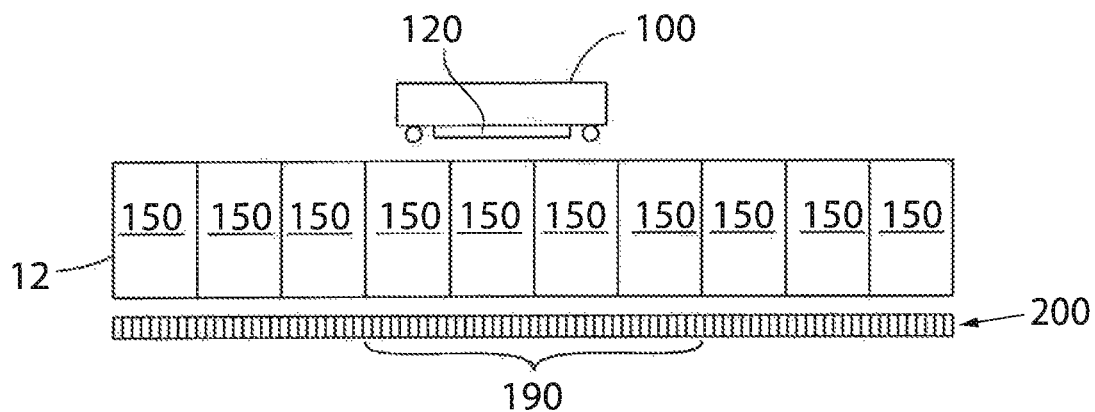
FIG. 10 is block diagram representation of blocks defined along the length of a track segment according to one embodiment of the invention.

In operation, a block-based motion control system is provided to improve the quality of motion of movers along the track and to provide improved collision prevention between movers. Turning next to FIG. 10, a track segment 12 includes multiple coils 150 positioned along the length of the track segment 12. A single mover 100 is shown on the track segment 12 for ease of illustration. The drive magnets 120, which interact with the coils 150 to propel the mover 100 along the track are also illustrated. Multiple blocks 200 are shown defined along the length of the track segment 12. Each block 200 has a width that spans a portion of the length of the track segment 12.

Figure 11:
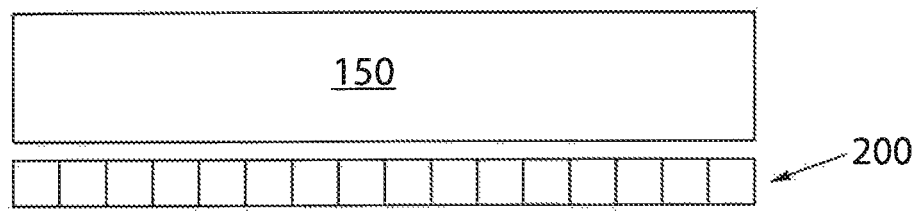
FIG. 11 is a block diagram representation of the blocks of FIG. 10 evenly spaced along the width of one coil of the track segment.
Figure 12:
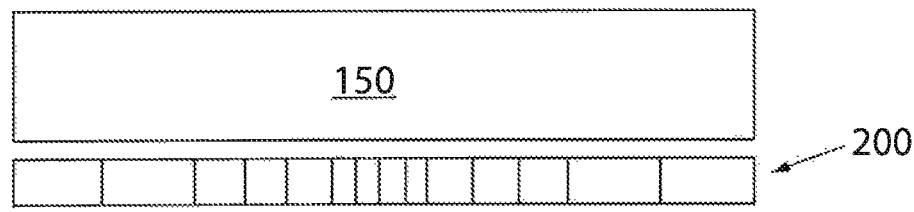
FIG. 12 is a block diagram representation of the blocks of FIG. 10 with variable spacing along the width of one coil of the track segment according to one embodiment of the invention.
Figure 13:
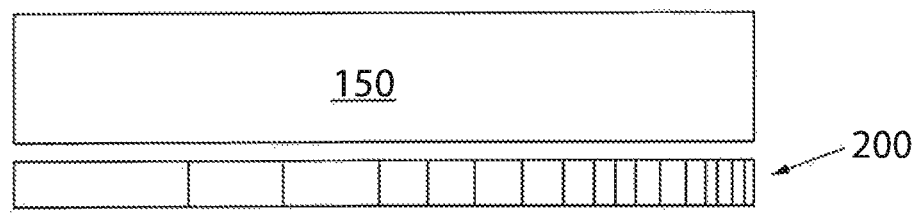
FIG. 13 is a block diagram representation of the blocks of FIG. 10 with variable spacing along the width of one coil of the track segment according to another embodiment of the invention.

According to one embodiment of the invention, the blocks 200 are statically defined. A predefined number of blocks 200 exist along each track segment 12, where each block 200 also has a predefined width. Adjacent movers may be positioned at closer intervals by defining blocks 200 having a smaller width. While a mover 100 may be positioned at any location within a block to which it is assigned, if the width of the block is greater, then, as a mover enters a block, the minimum spacing between the mover entering a block and the next adjacent mover is the width of the block. In other words, adjacent movers 100 may be positioned along smaller finite increments with statically defined blocks 200 when the width of each block is smaller. With reference also to FIG. 11, it is contemplated that each block 200 may have a uniform width and that the spacing along each track segment required for each coil 150 is divided into an equal number of blocks 200. With reference also to FIGS. 12 and 13, it is also contemplated that the blocks 200 may have variable widths along the length of the track segment 12 and/or for each coil 150 along the track segment. In still other embodiments, it is contemplated that a portion of the track segments 12 may have blocks 200 with uniform spacing while other track segments 12 may have blocks 200 with variable spacing. Similarly, the blocks 200 defined for each coil 150 along a track segment 12 may have variable spacing or fixed spacing. The choice of static spacing along the length of the track is a function of the application requirements.

According to another embodiment of the invention, the blocks 200 are dynamically defined. When the blocks are dynamically defined, it is contemplated that fewer blocks may be required. Because the width of each block 200 may change as a mover 100 travels along the track segment, the number of finite definitions required is reduced, with the potential resolution increasing. Operation of the dynamic definition of blocks will be discussed in more detail below with respect to FIGS. 14-17.

A coil 150 may be energized to drive a single mover 100 at a time. As previously discussed, each segment controller 50 regulates current flow to each coil 150 such that the energized coils 150 create electromagnetic fields that interact with the drive magnets 120 on each mover 100 to control motion of the movers 100 along the track segment 12. The electromagnetic field generally extends across the gap between the coil 150 and the drive magnets 120 mounted to the mover 100 to apply a force to the drive magnets 120 on the mover 100 located proximate each coil 150. To ensure that only one mover 100 at a time is influenced by the electromagnetic field generated by a coil, each block 200 associated with a coil 150 is limited to be assigned to a single set of drive magnets 120 at a time. When the drive magnets 120 span an entire coil 150, such as the middle coil 150 positioned under the drive magnets 120 illustrated in FIG. 10, all blocks 200 associated with the coil 150 may be assigned to a single mover 100. However, as a mover 100 travels along the track segment, a portion of the blocks 200 associated with a coil 150 may be assigned to a mover 100 while another portion, over which the mover 100 has just traveled, may be released and available to be assigned to another mover 100. Assignment of available blocks to a second mover 100 is limited to only portions of the second mover 100 that may extend beyond the drive magnets 120 on the second mover until the portion of the first mover 100 on which drive magnets 120 are mounted travel completely beyond the field generated by the coil 150.

Turning next to FIGS. 14-17, travel of three movers 100A, 100B, 100C along three coils 150A, 150B, 150C is illustrated with dynamic block definitions used to vary the width of blocks 202, 204, 206 used in this example. In the illustrated example, each mover 100A, 100B, 100C includes drive magnets 120 that extend for only a portion of the overall length of the mover. Each mover includes a first length 210A, 210B, 210C defined between a first end of the mover and a first end of the drive magnets 120. Each mover includes a second length 212A, 212B, 212C spanning the length of the drive magnets 120 on each mover. Each mover also includes a third length 214A, 214B, 214C defined between a second end of the drive magnets 120 and a second end of the mover. In other words, each mover 100A, 100B, 100C is constructed such that a portion of the mover extends in both directions beyond the drive members 120 mounted to the mover. In order to maximize throughput on the track, it is desirable to allow one mover 100 to extend over a coil while an adjacent mover is still located over the same coil.

The segment controller 50 manages blocks in order to permit such overlap of movers 100 above a single coil 150 while also preventing the drive members 120 from adjacent movers to be located over the coil in tandem. Along the length of the track segment spanned by each coil 150A, 150B, 150C, three dynamic blocks are defined. A first dynamic block 202A, 202B, 202C is defined from the start of the coil and extends for a first dynamically defined distance 203A, 203B, 203C across the coil. A second dynamic block 204A, 204B, 204C is defined to start at the end of the first dynamic block and extends for an additional second dynamically defined distance 205A, 205B, 205C across the coil. A third dynamic block 206A, 206B, 206C is defined from the end of the second dynamic block and extends for a third dynamically defined distance 207A, 207B, 207C to the end of the width of the coil.

Figure 14:
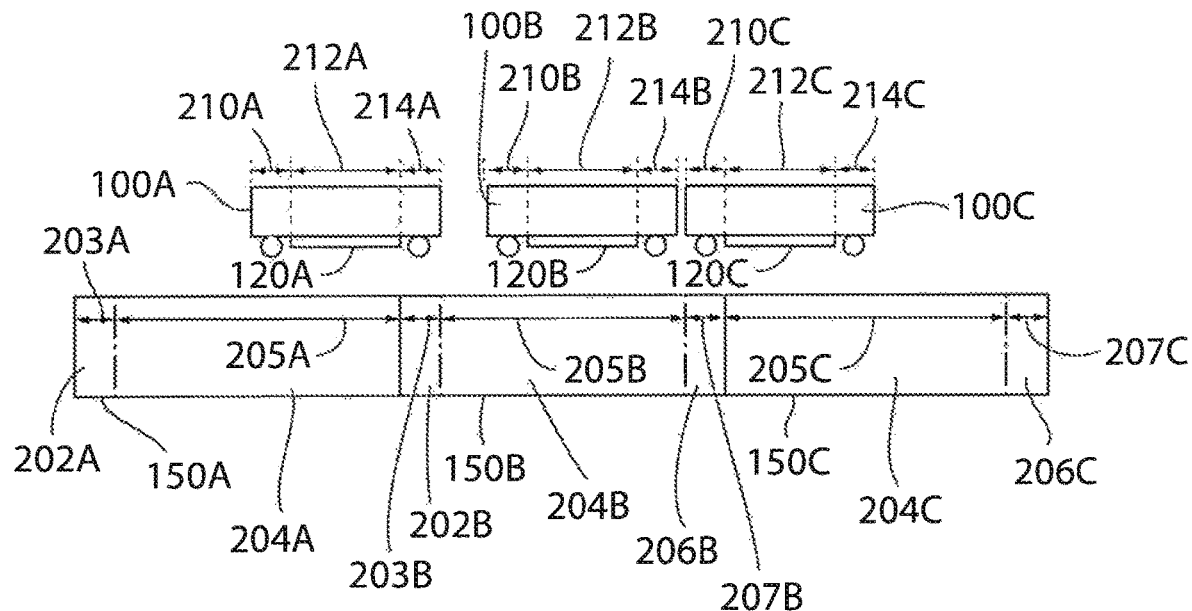
FIG. 14 is a block diagram representation of three movers positioned in an initial position along three coils with dynamic blocks defined according to one embodiment of the invention.

In FIG. 14, an initial position for each of the movers 100A-C is illustrated. This initial position may occur on power-up during which time blocks 202, 204, 206 within each coil 150 are each assigned to one of the movers 100. Optionally, the illustrated position may be a snapshot of a position taken as the movers 100A-C travel along the track segment, in either instance, the segment controller 50 enforces the rule of a single drive magnet 120A-C being located over each coil 150A-C at one time. Thus, the maximum number of movers 100 that may be located over each coil 150 is three. For purposes of discussion, the movers 100 will be traveling from left-to-right and relational terms will be assigned to movers accordingly. The relational terms are not intended to be limiting but are used for ease of illustration and discussion.

At the initial position shown in FIG. 14, the first mover 100A is positioned in part over the first coil 150A and in part over the second coil 150B. A first block 202A and a second block 204A for the first coil 150A are illustrated in the figure. The third block 206A for the first coil 150A is also defined within the segment controller 50; however, a width 207A for the third block 206A is set to zero. As a result, the third block 206A is not shown in the figure. The first block 202A is presently not assigned to any mover as the first mover 100A has travelled beyond the first block 202A and is intending to travel away from the first block 202A. The width 203A of the first block 202A is variable, but in the illustrated embodiment is set to a length 214 from one of the movers 100 that exists between the drive magnets 120 and the right end of the mover. As another mover travels along the track segment and approaches the first coil 150A, the first block 202A in the first coil 150A may be assigned to the new mover 100, allowing the mover 100 to travel into the space containing the first coil 150A only up to a distance of the overhang 214, This will prevent a drive magnet 120 from a following mover 100 from overlapping the first coil 150A until the drive magnet 120A of the first mover 100A has left the region of the first coil 150A. The second block 204A in the first coil 150A is assigned to the first mover 100A and allows the drive magnet 120A of the first mover 100A to travel along the width of the second block 204A. Because the first mover 100A extends at least partway into the second coil 150B, there is no need to utilize the third block 206A in the first coil 150A and its width is set to zero. The third block 206A may be assigned to the first mover 100A or, optionally, be unassigned to any mover when the width is set to zero. Optionally, a minimum width may be defined for the third block 206A and the third block 206A would also be assigned to the first mover 100A.

A portion of the first mover 100A, extending for the third length 214A defined on the mover, extends over the second coil 150B. The first block 202B in the second coil 150B is assigned to the first mover 100A, allowing a portion of the first mover 100A to extend over the second coil 150B, The width 203B of the first block 202B is identical to the width of the first mover 100A overhanging the second coil 150B. Initially, this width may be set to zero after the second mover 100B has released the first block 202B and the width may grow as the first mover 100A extends over the second coil 150B. Alternately, the width of the first block 202B may be set directly to the width 214A of the overhang for the first mover 100A as soon as the second mover 100B has released the first block 202B in the second coil 150B, indicating that the first mover 100A is free to extend over the second coil 150B for that distance.

The second mover 100B is positioned entirely over the second coil 150B. The drive magnets 120B for the second mover 100B are positioned over the second coil 150B and, therefore, interact with the electromagnetic field generated by the second coil 150B to drive the second mover 100B. The second block 204B in the second coil 150B is assigned to the second mover 100B. It is the only block assigned to the second mover and, therefore, the entire width of the second mover 100B must remain within the width 205B of this block 204B.

The third mover 100C is positioned in part over the second coil 150B and in part over the third coil 150C. Because the third mover 100C extends at least partway into the second coil 150B, there is no need to utilize the first block 202C in the third coil 150C and its width is set to zero. The first block 202C may be assigned to the third mover 100C or, optionally, be unassigned to any mover when the width is set to zero. Optionally, a minimum width may be defined for the first block 202C and the first block 202C would also be assigned to the third mover 100C. A second block 204C and a third block 206C are illustrated for the third coil 150C in FIG. 14. Initially, the third block 206C may be unassigned to any mover 100. The width 207C of the third block 206C may be set equal to the width 210 from one of the movers 100 that exists between the left end of the mover and the drive magnets 120. By leaving the third block 206C unassigned, the third block 206C is available either to the third mover 100C if it is travelling to the right and needs to enter the region spanned by the third block 206C or, alternately, the third block 206C is available to another mover 100 approaching the third coil 150C in the other direction and is available to permit the overhang 210 from the left end of the mover 100 enter the third coil 150C. The second block 204C of the third coil is assigned to the third mover 100C, allowing the drive magnets 120 of the third mover to be positioned over the third coil 150C. A portion of the third mover 100C, extending for the first length 210C defined on the mover extends over the second coil 150B. The third block 206B in the second coil 150B is assigned to the third mover 100C, allowing the third mover 100C to extend over the second coil 150B. The width 207B of the third block 206B is identical to the width of the third mover 100C overhanging the second coil 150B. Initially, this width may be set to the width 210C of the overhang on the left end of the mover and transition to zero as the third mover 100C travels onto the third coil 150C.

As may be observed from the second coil 150B, the maximum number of blocks 202, 204, 206 defined for each coil in this example is three. A first block 202 allows for a mover to overhang from one side of the coil, and a third block 206 allows a mover to overhang from the opposite side of the coil. A second block 204 is defined to accommodate the mover 100 and its corresponding drive member 120 that is positioned over the coil 150. The widths of the blocks along the edges of the coil 150 define the width of the middle block. If each mover 100 has an identical construction, the maximum width for the first block 202 and for the third block 206 corresponds to the width 210 of either the first overhang or the width 214 of the second overhang on a mover 100. The width 205 of the second block 204 is the width of the entire coil 150 minus the combined widths of the first 202 and third 206 blocks.

Figure 15:
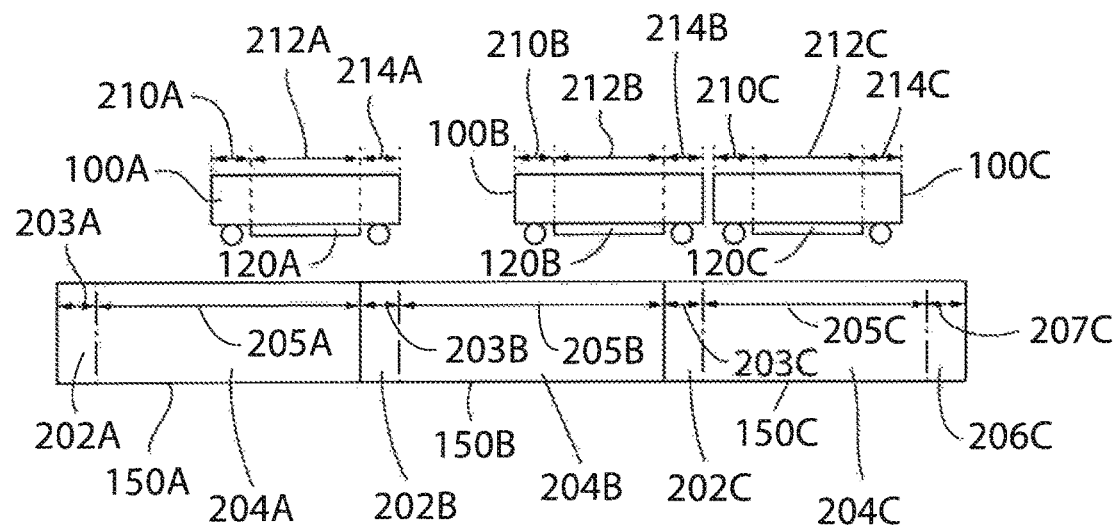
FIG. 15 is a block diagram representation of the movers in FIG. 14 positioned in a second position along the three coils with the dynamic blocks redefined according to the motion of the movers.

Turning next to FIG. 15, the second and third movers 100I, 100C begin moving to the right. The third block 206C in the third coil 150C may be assigned to the third mover 100C in anticipation of the third mover entering the space defined by this block. The second block 204C in the third coil 150C remains assigned to the third mover 100C, but the first block 202C in the third coil 150C is assigned to the second mover 100I. As the third mover 100C travels to the right, the width 205C of the second block 204C decreases and the width 203C of the first block increases, where the boundary between the first and second block follows the trailing edge of the third mover 100C. The width 2030 of the first block increases until it equals the width 214B of the overhang on the front of the second mover 100B, allowing the maximum width of the second mover 100B to enter the third coil 150C while a portion of the drive member 120C for the third mover is still positioned over the third coil. Optionally, the segment controller 50 may be configured to add a small buffer to the rear of the third mover 100C and the boundary between the first and second block follows the trailing edge of the third mover 100C plus the additional buffer. The additional buffer may be, for example, tens or hundreds of millimeters, but could be as little as one to five millimeters with an exemplary buffer set to three millimeters. The additional buffer prevents the trailing edge of the third mover 100C from directly contacting the leading edge of the second mover if the second mover 100B is commanded to be positioned in the furthest position forward to which it may be positioned based on the blocks assigned to it while the third mover 100C is commanded to be positioned in the furthest position rearward to which it may be positioned based on the blocks assigned to it. The second mover 100B is able to travel to the right only as far as the width 214B of the overhang of the mover beyond the drive magnets 120E to the right side of the mover. When the second mover 100B reaches this limit, it must wait for the third mover 100C to clear the third coil.

Figure 16:
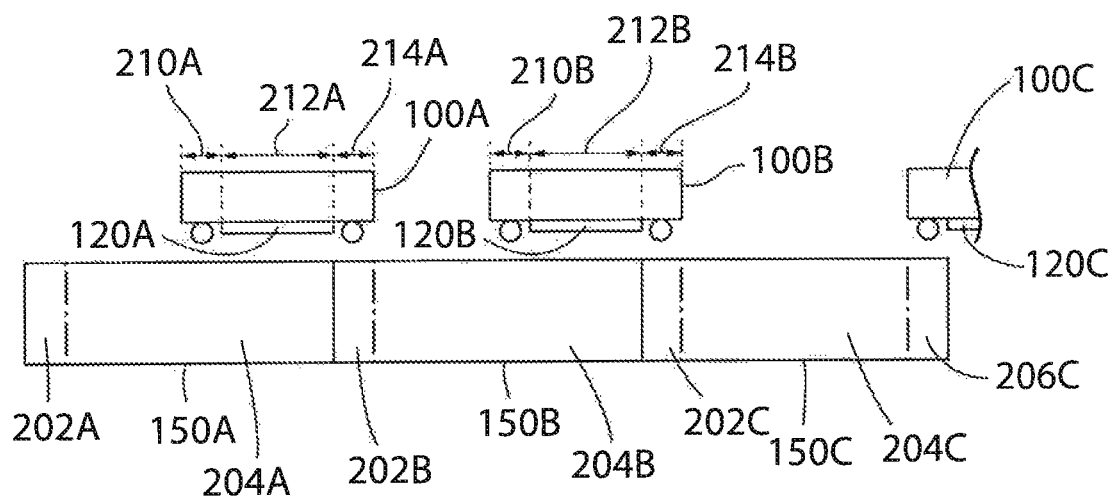
FIG. 16 is a block diagram representation of the movers in FIG. 14 positioned in a third position along the three coils with the dynamic blocks redefined according to the motion of the movers.

Turning next to FIG. 16, it is observed that the second mover 100B has remained at the final point of travel from FIG. 15. The third mover 100C, however has continued to travel to the right. At the point illustrated in FIG. 16, it is contemplated that the drive magnets 120C on the third mover 100C have just cleared the third coil 150C and the second block 204C is, therefore, released by the third mover 100C. With the second block 204C of the third coil 150C released by the third mover 100C, it can now be assigned to the second mover 100B. Once the second block 204C is assigned to the second mover 100B, the second mover is, in turn permitted to travel into the third coil 150C for the width 205C of the second block 204C. As the third mover 100C travels off of the third coil 150C, the width 207C of the third block 206C decreases and the width 205C of the second block 204C increases, where the boundary between the third and second block follows the trailing edge of the third mover 100C.

Figure 17:
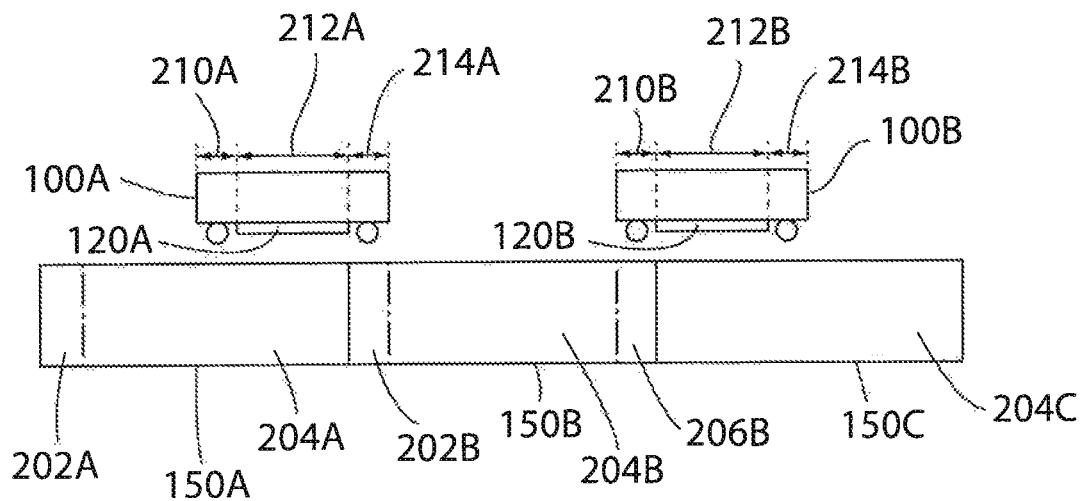
FIG. 17 is a block diagram representation of the movers in FIG. 14 positioned in a fourth position along the three coils with the dynamic blocks redefined according to the motion of the movers.

Finally, in FIG. 17, the third mover 100C has cleared the third coil 150C and the second mover 100B has traveled a sufficient distance that its drive magnets 120B are positioned entirely over the third coil 150C and no longer overlapping the second coil 150B. The second mover 100B now releases the second block 204B on the second coil 150B such that just the third block 206B on the second coil and the second block 204C on the third coil 150C are assigned to the second mover 100B. The second block 204C on the third coil 150C is assigned the entire width of the third coil 150C. Optionally, a portion of the width may remain assigned to the first block 202C of the third coil and the first block 202C may also be assigned to the second mover 100B. With the second block 204B of the second coil 150B released by the second mover 100B, it can now be assigned to the first mover 100A. Once the second block 204B is assigned to the first mover 100A, the first mover is, in turn, permitted to travel into the second coil 150B for the width 205B of the second block 204B. As the second mover 100B travels off of the second coil 150B, the width 207B of the third block 206B decreases and the width 205B of the second block 204B increases, where the boundary between the third and second block follows the trailing edge of the second mover 100B. If this is an initial start-up the three movers 100A, 100B, 100C are now spaced apart a sufficient distance that they can continue traveling at the same speed along the track without requiring any of the movers to change speed. As the drive magnets 120 for one mover 100 begin to enter the next adjacent coil 150, the drive magnets 120 of the preceding mover 100 will have left the adjacent coil, allowing successive assignment of blocks to each mover 100. Further, the blocks 202, 204, 206 will successively be assigned to each mover and the boundaries between blocks follow leading and/or trailing edges of movers 100 as they pass over the blocks, thereby dynamically defining block widths and the regions in which each mover is permitted to travel.

Figure 18:
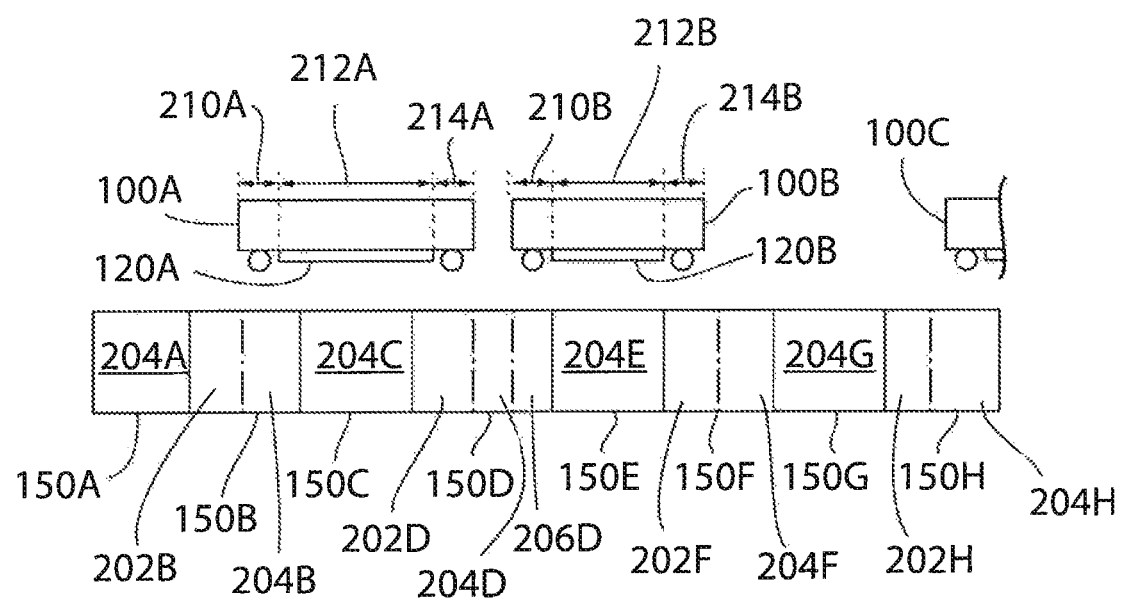
FIG. 18 is a block diagram representation of three movers positioned, at least in part, along a track segment in which each mover has a length greater than a width of each coil in the track segment.

Turning next to FIG. 18, an embodiment of the invention is illustrated in which an overall width of each mover 100 is greater than an overall width of each coil 150. As shown in the illustrated embodiment, no more than two movers 100 may be present above a single coil 150. In such an embodiment, it is contemplated that each coil 150 may have two dynamic blocks 202, 204 associated with the coil 150. The boundary of each dynamic block 202, 204 may change in a manner similar to that discussed above with respect to dynamically assigning boundaries of three blocks. With reference, for example, to the second coil 150B shown in FIG. 18, a first dynamic block 202B may be unassigned to any mover and a second dynamic block 204B is assigned to the first mover 100A. As the first mover travels to the right, the boundary between the two blocks may change, following the trailing edge of the first mover. Thus, the width of the second dynamic block 204B grows smaller until it reaches zero and the width of the first dynamic block 204A grows larger until it reaches the entire width of the second coil 150B. Optionally, a maximum width for the first block 204A may be assigned, where the maximum width may be, for example, set to a width 214 of an overhang by a mover 100 as it travels on to the coil 150. This is shown, for example, as a third mover 100C exits the track segment on the final coil 150H. The boundary between the first dynamic block 202H and the second dynamic block 204H was varied with the third mover 100C as it traveled to the right until it reached the maximum width (i.e., the width 214B of the overhang for the second mover 100b) for the first dynamic block 202H. The first dynamic block 202H remains unassigned to any mover and could be assigned to the second mover 100B if it is commanded to move onto the final coil 150H before the third mover 100C exits the coil.

When a mover 100 entirely covers a single coil 150, it is contemplated that the width of one block may go to zero and the width of the other block may span the entire width of the coil. For example, the third coil 150C shows the second block 204C spanning the width of the coil while the first block 202C has a width set to zero.

As a mover 100 enters a new coil 150, a portion of the width, or the entire width, of the coil may be assigned to the mover 100. As shown in the sixth coil 150F, the first block 202F was assigned a width greater than that required for the presence of the second mover 100B over that coil. Optionally, the width of the first block 202F could be identical to the width required for the second mover 100 to overhang the sixth coil 150F. As still another option, the entire sixth coil 150E may have been assigned to the second mover 100 as there was no other mover 100 presently located over or being controlled by the sixth coil 150F.

Even if the overall width of each mover 100 is greater than an overall width of each coil 150, it may still be desirable to utilize three dynamic blocks 202, 204, 206 within a coil 150 to facilitate bidirectional movement along the track. With reference to the fourth coil 150D, three dynamic blocks 202D, 204D, 206D are shown. The first dynamic block 202D is assigned to the first mover 100A, the second dynamic block 204D is assigned to no mover, and the third dynamic block 206D is assigned to the second mover 100B.

If the assignments of widths to different dynamic blocks proceeded in a similar manner to that discussed above, the fourth coil 150D would have only two dynamic blocks with the second block being wide enough to accommodate the rear overhang 210B of the second mover and the first block being assigned to the remainder of the width of the coil. Such an arrangement works well if movers are only travelling in one direction. The controller only requires knowledge of the location and width of the second mover 100B and may adjust the boundaries between blocks accordingly.

However, if travel in the reverse direction is desired and only two blocks are defined, the controller would need to move the boundary between blocks in both directions. Because the first block would be assigned to the first mover, knowledge of the position of the first mover 100A, the rate of speed of travel of the first mover, the maximum deceleration rate for the first mover, and any other variable that may impact the minimum required stopping distance of the first mover would be required for the controller to determine whether it was safe to move the boundary between blocks toward the first mover.

In contrast, an unassigned block 204D may be utilized to facilitate motion in both directions. Rather than automatically assigning the distance behind a mover leaving a coil to the next mover approaching the coil, the controller may set an unassigned block 204D between movers. As the second mover 100B leaves the fourth coil 150D the width of the unassigned block 204D grows while the width of the third block 206D assigned to the second mover 100B goes to zero. When the second mover 100B is entirely off the fourth coil 150D, the width of the unassigned block 204D remains static until a mover is required to mover over the fourth coil. This mover could be either the first mover 100A or the second mover 100B. If the first mover 100A follows the second mover 100B, the width of the first block 202D may grow while the width of the second block 204D shrinks. The width of the third block 206D remains zero. If, however, the second mover 100B is required to reverse direction and return over the fourth coil 150D, the width of the third block 206D begins to increase while the width of the second block 204D decreases. It is possible that both movers 100 may travel towards each other with the width of each of the first and third blocks growing while the width of the second block shrinks as long as the magnets 120 for only one of the movers 100 is present of the coil 150. If the combined widths of the forward overhang 214A of the first mover 100A and the rear overhang 210B of the second mover 100B is greater than the width of the coil, the width of the second block 204D may shrink to zero until the entire width of the coil 150D is allocated to accommodate a portion of each of the two movers. By utilizing an unassigned block, a portion of the width the coil may readily be assigned to either mover, regardless of the direction in which it is approaching the coil 150.

It is further contemplated that unassigned blocks may be utilized in conjunction with the embodiment discussed above with respect to FIGS. 14-17 in which the width of coil 150 exceeds the width of the drive magnets 120. In this embodiment, it would be desirable to include two unassigned blocks, where one unassigned block is inserted between the first and second block discussed above and another unassigned block is inserted between the second and third block discussed above. The resulting system would result in five dynamically assigned blocks which facilitate bidirectional motion of the embodiment shown in FIGS. 14-17. Although discussed above with respect to dynamically adjusted block boundaries, similar operation of the motion control system would occur with static block boundaries. Each coil 150 may be divided into various block configurations as shown in FIGS. 11-13. For ease of discussion, it will be assumed that the coil 150 is divided into evenly spaced blocks 200 as shown in FIG. 11. As a mover 100 travels beyond each block, those blocks 200 positioned behind the mover 100 are released by the mover 100. However, a mover 100 will only release a number of blocks 200 such that the combined width of the blocks 200 assigned to the trailing mover does not exceed the width 214 of the overhang at the front of the trailing mover while the drive magnets 120 for the leading mover remain over a coil 150. In this manner, a trailing mover cannot be assigned more blocks 200 than will accommodate the overhang. Once the drive magnets 120 of a mover 100 exit a coil 150, the mover 100 may release blocks 200 up to a sufficient number to accommodate the width 210 of the rear overhang of the mover 100. In this manner, a trailing mover 100 may now be assigned blocks 200 allowing the drive magnets 120 of the trailing mover 100 to enter the next coil, yet the leading mover retains sufficient distance within the coil to accommodate it rear overhang. As the leading mover continues to transition out of the coil 150, successive blocks 200 may be released until it is clear of the coil 150 and no longer has any blocks 200 within the prior coil 150 assigned to it.

It should be understood that the invention is not limited in its application to the details of construction and arrangements of the components set forth herein. The invention is capable of other embodiments and of being practiced or carried out in various ways, Variations and modifications of the foregoing are within the scope of the present invention. It also being understood that the invention disclosed and defined herein extends to all alternative combinations of two or more of the individual features mentioned or evident from the text and/or drawings. Ail of these different combinations constitute various alternative aspects of the present invention. The embodiments described herein explain the best triodes known for practicing the invention and will enable others skilled in the art to utilize the invention.

We claim:

1. A system for improved motion control in a linear drive system, comprising:
    a track including a plurality of track segments, wherein:
        each of the plurality of track segments includes a plurality of drive coils positioned along the corresponding track segment,
        each of the plurality of drive coils has a first width, and
        each of the plurality of track segments is divided into a plurality of blocks, wherein at least one of the plurality of blocks has a second width, the second width less than the first width;
    a plurality of movers operative to travel along the track, wherein each mover includes at least one drive member, the at least one drive member operative to propel the corresponding mover along the track responsive to electromagnetic fields generated by each of the plurality of drive coils;
    a controller operative to:
        assign each of the plurality of blocks to only one of the plurality of movers at a time, and
        allow each of the plurality of movers to travel along the track only within each of the plurality of blocks assigned to the corresponding mover.

2. The system of claim 1 wherein:
    each of the plurality of movers has a first length,
    each of the at least one drive members has a second length, and
    the first length is greater than the second length.

3. The system of claim 1 wherein a portion of one of the plurality of track segments, defined by the first width of one of the plurality of drive coils, includes a first block, selected from the plurality of blocks, and a second block, selected from the plurality of blocks, and wherein a first mover, selected from the plurality of movers, is assigned the first block and a second mover, selected from the plurality of movers, is assigned the second block.

4. The system of claim 1 further comprising a memory operative to store the second width of each of the plurality of blocks, wherein the controller is further operative to dynamically change the second width of at least a portion of the plurality of blocks as the plurality of movers travel along the track.

5. The system of claim 4 wherein three blocks, selected from the plurality of blocks, are defined within the first width for each of the plurality of coils.

6. The system of claim 5 wherein:
the three blocks include a first block at a first end of the first width, a third block at a second end of the first width, and a second block between the first and third blocks;
the first block has a first dynamic width between zero and a first maximum width;
the third block has a third dynamic width between zero and a second maximum width; and
the second block has a second dynamic width equal to the first width of the corresponding drive coil minus a summation of the first dynamic width and the third dynamic width.

7. The system of claim 5 wherein:
the three blocks include a first block, a second block, and a third block,
the first block is assigned to a first mover,
the third block is assigned to a second mover,
the second block is located along the track between the first block and the third block, and
the second block is not assigned to any of the plurality of movers.

8. A system for improved motion control in a linear drive system, comprising:
a plurality of track segments defining a track, wherein:
each of the plurality of track segments includes a plurality of first drive members positioned along the corresponding track segment,
each of the plurality of first drive members has a first width, and
each of the plurality of track segments is divided into a plurality of blocks, wherein at least one of the plurality of blocks has a second width, the second width less than the first width;
a plurality of movers operative to travel along the track, wherein each mover includes at least one second drive member, the at least one second drive member operative to engage the plurality of first drive members along each of the plurality of track segments to propel the corresponding mover along the track, wherein one of the first and the second drive member generates an electromagnetic field and the mover travels along the track segment responsive to the electromagnetic field;
a controller operative to:
assign each of the plurality of blocks to only one of the plurality of movers at a time, and
allow each of the plurality of movers to travel along the track only within each of the plurality of blocks assigned to the corresponding mover.

9. The system of claim 8 further comprising a memory operative to store the second width of each of the plurality of blocks, wherein the controller is further operative to dynamically change the second width of at least a portion of the plurality of blocks as the plurality of movers travel along the track.

10. The system of claim 9 wherein three blocks, selected from the plurality of blocks, are defined within the first width for each of the plurality of first drive members.

11. The system of claim 10 wherein:
the three blocks include a first block at a first end of the first width, a third block at a second end of the first width, and a second block between the first and third blocks;
the first block has a first dynamic width between zero and a first maximum width;
the third block has a third dynamic width between zero and a second maximum width; and
the second block has a second dynamic width equal to the first width of the corresponding drive coil minus a summation of the first dynamic width and the third dynamic width.

12. The system of claim 10 wherein:
the three blocks include a first block, a second block, and a third block,
the first block is assigned to a first mover,
the third block is assigned to a second mover,
the second block is located along the track between the first block and the third block, and
the second block is not assigned to any of the plurality of movers.

13. The system of claim 8 wherein a portion of one of the plurality of track segments, defined by the first width of one of the plurality of first drive members, includes a first block, selected from the plurality of blocks, and a second block, selected from the plurality of blocks, and wherein a first mover, selected from the plurality of movers, is assigned the first block and a second mover, selected from the plurality of movers, is assigned the second block.

14. The system of claim 8 wherein:
each of the plurality of movers has a first length,
each of the at least one second drive members has a second length, and
the first length is greater than the second length.

15. A method for improved motion control in a linear drive system, the method comprising the steps of:
defining a plurality of blocks along a length of each track segment from a plurality of track segments, wherein:
the plurality of track segments define a track along which a plurality of movers are operative to travel,
each of the plurality of track segments includes a plurality of drive coils positioned along the length of the corresponding track segment,
each of the plurality of drive coils has a first width, and
at least one of the plurality of blocks has a second width, the second width less than the first width;
assigning each of the plurality of blocks to only one of the plurality of movers at a time with a controller for the linear drive system; and
controlling operation of each mover along the track segment with the controller, such that each mover is positioned only within each of the plurality of blocks assigned to the corresponding mover.

16. The method of claim 15 wherein a portion of one of the plurality of track segments, defined by the first width of one of the plurality of drive coils, includes a first block, selected from the plurality of blocks, and a second block, selected from the plurality of blocks, and wherein a first mover, selected from the plurality of movers, is assigned the first block and a second mover, selected from the plurality of movers, is assigned the second block.

17. The method of claim 15 wherein a memory is operative to store the second width of each of the plurality of blocks, the method further comprising the step of dynamically changing the second width of at least a portion of the plurality of blocks with the controller as the plurality of movers travel along the track.

18. The method of claim 17 wherein three blocks, selected from the plurality of blocks, are defined within the first width for each of the plurality of coils.

19. The method of claim 18 wherein:
- the three blocks include a first block at a first end of the first width, a third block at a second end of the first width, and a second block between the first and third blocks;
- the first block has a first dynamic width between zero and a first maximum width;
- the third block has a third dynamic width between zero and a second maximum width; and
- the second block has a second dynamic width equal to the first width of the corresponding drive coil minus a summation of the first dynamic width and the third dynamic width.

20. The method of claim 15 wherein:
- each of the plurality of movers has a first length,
- each mover includes at least one drive member,
- each of the at least one drive members has a second length, and
- the first length is greater than the second length.

* * * * *